(12) United States Patent
Jeong et al.

(10) Patent No.: US 9,557,570 B2
(45) Date of Patent: Jan. 31, 2017

(54) DISPLAY DEVICE AND LIQUID CRYSTAL LENS PANEL FOR THE SAME

(71) Applicant: SAMSUNG DISPLAY CO., LTD., Yongin, Gyeonggi-Do (KR)

(72) Inventors: Seung Jun Jeong, Hwaseong-si (KR); Kyung Ho Jung, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 257 days.

(21) Appl. No.: 14/253,654

(22) Filed: Apr. 15, 2014

(65) Prior Publication Data

US 2015/0116611 A1 Apr. 30, 2015

(30) Foreign Application Priority Data

Oct. 28, 2013 (KR) ........................ 10-2013-0128716

(51) Int. Cl.
*G02F 1/1343* (2006.01)
*G02F 1/29* (2006.01)
*G02B 27/22* (2006.01)

(52) U.S. Cl.
CPC ..... *G02B 27/2214* (2013.01); *G02F 1/134309* (2013.01); *G02F 1/29* (2013.01); *G02F 2001/294* (2013.01)

(58) Field of Classification Search
CPC ......................... G02B 27/2214; H04N 13/0404
See application file for complete search history.

(56) References Cited

U.S. PATENT DOCUMENTS

| | | | |
|---|---|---|---|
| 8,305,551 | B2 | 11/2012 | Son |
| 2007/0296911 | A1 | 12/2007 | Hong |
| 2010/0157181 | A1 | 6/2010 | Takahashi |
| 2011/0090415 | A1* | 4/2011 | Asatryan et al. ............... 349/33 |
| 2011/0228181 | A1 | 9/2011 | Jeong et al. |
| 2012/0242913 | A1* | 9/2012 | Miyazawa et al. ............... 349/5 |
| 2012/0257127 | A1 | 10/2012 | Miyazawa et al. |
| 2013/0107174 | A1 | 5/2013 | Yun et al. |
| 2013/0208196 | A1* | 8/2013 | Kim et al. ...................... 349/15 |

FOREIGN PATENT DOCUMENTS

| | | |
|---|---|---|
| KR | 10-2009-0004006 | 1/2009 |
| KR | 10-2010-0013179 | 2/2010 |
| KR | 10-2011-0104701 | 9/2011 |
| KR | 10-1222990 | 1/2013 |

* cited by examiner

*Primary Examiner* — Dung Nguyen
(74) *Attorney, Agent, or Firm* — F. Chau & Associates, LLC

(57) ABSTRACT

A display device includes a display panel and a liquid crystal lens panel. The liquid crystal lens panel includes a first substrate and a second substrate that face each other; a first electrode layer disposed on the first substrate; a second electrode layer disposed on the second substrate; and a liquid crystal layer interposed between the first substrate and the second substrate. The first electrode layer includes a plurality of first linear electrodes and a plurality of second linear electrodes, the liquid crystal layer includes first liquid crystal molecules adjacent to the first linear electrode that are pre-tilted in a first direction, and second liquid crystal molecules adjacent to the second linear electrodes that are pre-tilted in a second direction opposite the first direction.

20 Claims, 12 Drawing Sheets

DISPLAY DEVICE AND LIQUID CRYSTAL LENS PANEL FOR THE SAME

CROSS-REFERENCE TO RELATED APPLICATION

This application claims priority from Korean Patent Application No. 10-2013-0128716 filed in the Korean Intellectual Property Office on Oct. 28, 2013, and all the benefits accruing therefrom, the contents of which are herein incorporated by reference in their entirety.

BACKGROUND (a) Technical Field

Embodiments of the present disclosure relates to a display device and a liquid crystal lens panel therefor.

(b) Discussion of the Related Art

In recent years, as display device technology has developed, 3D stereoscopic image display devices have attracted attention and various 3D image display methods have been studied.

One method that has most generally been used to display stereoscopic imaged is the method of binocular disparity. In the method of binocular disparity, an image that reaches a left eye and an image that reaches a right eye are displayed by the same display device, and the images are respectively received by the left eye and the right eye of an observer. That is, images observed at different angles are received by both eyes to allow an observer to perceive a 3D effect.

In this case, the method of binocular disparity includes a method of using a barrier and a method of using a lenticular lens, which is a kind of cylindrical lens.

A stereoscopic image display device that uses a barrier forms a slit on the barrier and divides the image transmitted by the display device into a left-eye image and a right-eye image through the slit to be received by the left eye and right eye of the observer, respectively.

A stereoscopic image display device that uses a lenticular lens displays a left-eye image and a right-eye image and divides the image transmitted by the stereoscopic image display device into the left-eye image and the right-eye image by changing a light path through the lens.

In addition, 2D-cum-3D image displays which can display a 2D image and a 3D image have been developed, and to this end, a liquid crystal lens panel which can switch between the 2D image and the 3D image has been developed. A polarizer that can remove external light components is attached to a conventional liquid crystal lens panel to provide a clean image to a viewer.

However, a polarizer of a liquid crystal lens panel may reduce the efficiency of light emitted from a display panel, and as a result, may deteriorate characteristics of the liquid crystal lens panel.

SUMMARY

Embodiments of the present disclosure may provide a display device and a liquid crystal lens panel therefor, that can improve characteristics of the liquid crystal lens panel.

An exemplary embodiment of the present disclosure provides a display device including: a display panel and a liquid crystal lens panel. The liquid crystal lens panel includes: a first substrate and a second substrate that face each other; a first electrode layer disposed on the first substrate; a second electrode layer disposed on the second substrate; and a liquid crystal layer interposed between the first substrate and the second substrate. The first electrode layer includes a plurality of first linear electrodes and a plurality of second linear electrodes, the liquid crystal layer includes first liquid crystal molecules adjacent to the first linear electrodes that are pre-tilted in a first direction, and second liquid crystal molecules adjacent to the second linear electrodes that are pre-tilted in a second direction that is opposite to the first direction.

The second electrode layer may be a plate-like electrode.

The display device may further include a first alignment layer disposed on the first linear electrodes and the second linear electrodes, and a second alignment layer disposed on the second electrode layer.

The first linear electrode and the second linear electrode may extend in a y-axis direction and may be alternately disposed in an x-axis direction.

The first direction may be one of a positive y-axis direction and a negative y-axis direction, and the second direction may be the other direction thereof.

The liquid crystal lens panel may operate in the 2D mode when a reference voltage is applied to the first electrode layer, the first linear electrode, and the second linear electrode, in which an image displayed by the display panel is recognized as a 2D image.

The liquid crystal lens panel may operate in the 3D mode when a reference voltage, a first voltage, and a second voltage are respectively applied to the second electrode layer, the first linear electrode, and the second linear electrode, in which an image displayed by the display panel is recognized as a 3D image.

A first voltage difference between the second electrode layer and the first linear electrode may differ from a second voltage difference between the second electrode layer and the second linear electrode.

When the liquid crystal lens panel operates in 3D mode, the liquid crystal molecules located between the first linear electrode and the second linear electrode rotate in one plane.

Another embodiment of the present disclosure provides a liquid crystal lens panel that includes: a first substrate that include a first linear electrode and a second linear electrode; a second substrate that include a plate-like electrode; and a liquid crystal layer interposed between the first substrate and the second substrate that includes a unit element. The first linear electrode and the second linear electrode form a zone in the unit element, the zone includes a first region at a side of the first linear electrode and a second region at a side of the second linear electrode, the liquid crystal molecules are pre-tilted in a first direction in the first region, and the liquid crystal molecules are pre-tilted in a second direction opposite the first direction in the second region.

The liquid crystal lens panel may further include a first alignment layer disposed on the first linear electrode and the second linear electrode, and a second alignment layer disposed on the plate-like electrode.

The first linear electrode and the second linear electrode may respectively include a plurality of first linear electrodes and a plurality of second linear electrodes, and the first linear electrodes and second linear electrodes may extend in a y-axis direction and may be alternately disposed in an x-axis direction.

The unit element may include a plurality of zones, and a width of each zone becomes narrower with increasing distance from a center thereof.

The first direction may be one of a positive y-axis direction and a negative y-axis direction, and the second direction may be the other direction thereof.

The liquid crystal lens panel may operate in a 2D mode when a reference voltage is applied to the plate-like electrode, the first linear electrode, and the second linear electrode, in which an image displayed by the liquid crystal lens panel is recognized as a 2D image.

The liquid crystal lens panel may operate in a 3D mode when a reference voltage, a first voltage, and a second voltage are respectively applied to the plate-like electrode, the first linear electrode, and the second linear electrode, in which the unit element forms a lens and an image displayed by the liquid crystal lens panel is recognized as a 2D.

A first voltage difference between the plate-like electrode and the first linear electrode may be different from a second voltage difference between the plate-like electrode and the second linear electrode.

When the liquid crystal lens panel operates in 3D mode, the liquid crystal molecules located between the first linear electrode and the second linear electrode may rotate in one plane.

Another exemplary embodiment of the present disclosure provides a liquid crystal lens panel that includes: a first substrate and a second substrate that face each other; a plurality of first linear electrodes and a plurality of second linear electrodes alternatingly disposed on the first substrate; a second electrode layer disposed on the second substrate; and a liquid crystal layer interposed between the first substrate and the second substrate that includes a plurality of unit elements. When a reference voltage is applied to the first electrode layer, the first linear electrodes, and the second linear electrodes, the liquid crystal lens panel operates in a 2D mode, and when a reference voltage, a first voltage, and a second voltage are respectively applied to the second electrode layer, the first linear electrode, and the second linear electrode, the unit elements form lenses and the liquid crystal lens panel operates in a 3D mode.

The first linear electrode and the second linear electrode may form a zone in each unit element which includes a first region at a side of the first linear electrode and a second region at a side of the second linear electrode. Liquid crystal molecules may be pre-tilted in a first direction in the first region and may be pre-tilted in a second direction opposite the first direction in the second region. In 3D mode, a first voltage difference between the plate-like electrode and the first linear electrode may differ from a second voltage difference between the plate-like electrode and the second linear electrode, and the liquid crystal molecules located between the first linear electrode and the second linear electrode may rotate in one plane.

In accordance with the exemplary embodiments of the present disclosure, display characteristics of a liquid crystal lens panel may be improved. It is also possible to prevent efficiency of light emitted from the display panel from deteriorating due to an additional polarizer.

DETAILED DESCRIPTION

Figure 1:
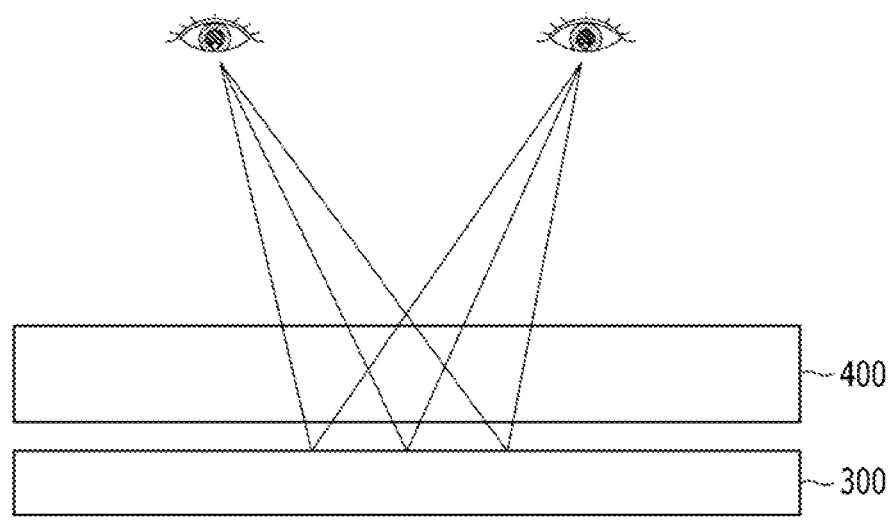
FIG. 1 shows a schematic structure of a display device and a 2D image in accordance with an exemplary embodiment of a present disclosure.

Hereinafter, exemplary embodiments of the present disclosure will be described in detail with reference to the attached drawings such that the present disclosure can be easily practiced by those skilled in the art. As those skilled in the art would realize, the described embodiments may be modified in various different ways, all without departing from the spirit or scope of the present disclosure.

For various exemplary embodiments, constituent elements having the same constitutions may be designated by the same reference numerals and are explained representatively in a first exemplary embodiment. In the other exemplary embodiments, only constituent elements different from those in a first exemplary embodiment are described.

In the drawings, the thickness of layers, films, panels, regions, etc., may be exaggerated for clarity. When a first part of a layer, a film, a plate, or the like is described as being arranged "on" or "over" a second part, the first part can be arranged on or over the second part directly or with a third part therebetween. Similarly, when a first part of a layer, a film, a plate, or the like is described as being arranged "beneath" or "below" a second part, the first part can be arranged beneath or below the second part directly or with a third part.

Figure 2:
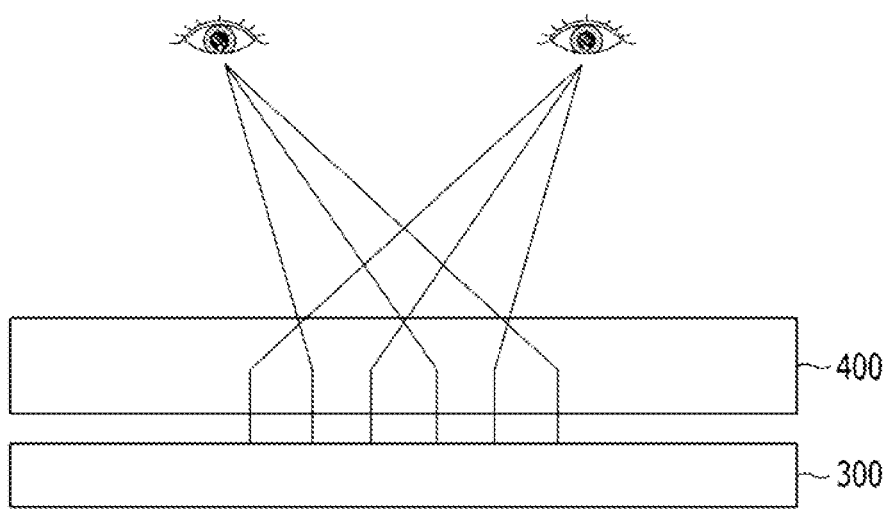
FIG. 2 shows a schematic structure of the display device and a 3D image in accordance with a present exemplary embodiment.

FIG. 1 shows a schematic structure of a display device and a 2D image in accordance with an exemplary embodiment of a present disclosure. FIG. 2 shows a schematic structure of the display device and a 3D image in accordance with a present exemplary embodiment.

Referring to FIG. 1 and FIG. 2, a display device includes a display panel 300 for displaying an image, and a liquid crystal lens panel 400 provided in front of a surface of the display panel 300 on which the image is displayed. The display panel 300 and the liquid crystal lens panel 400 may be operated in a 2D mode or a 3D mode.

The display panel 300 may be one of various display panels types, such as a plasma display, a liquid crystal display, or an organic light emitting display. The display panel 300 includes a plurality of pixels PX arranged in a matrix form that display an image. The display panel 300 displays a 2D image in 2D mode, but may, in 3D mode, alternately display images corresponding to various visual fields such as a right eye image and a left eye image in a space division scheme or a time division scheme. For example, the display panel 300 may alternately display the right eye image and the left eye image at every other pixel column in 3D mode.

The liquid crystal lens panel 400 is configured to be switchably operated between 2D mode, in which an image displayed on the display panel 300 is recognized as a 2D image, and 3D mode, in which the image is recognized as a 3D image. The liquid crystal lens panel 400 transmits the image displayed on the display panel 300 as it is in 2D mode. In 3D mode, the liquid crystal lens panel 400 divides the image displayed on the display panel 300 into viewing areas. In other words, the liquid crystal lens panel 400 operated in 3D mode focuses multiple viewpoint images, including the left eye image and the right eye image, onto visual fields that correspond to each viewpoint image using light diffraction and refraction.

FIG. 1 shows a case where the display panel 300 and the liquid crystal lens panel 400 operate in 2D mode. The same image reaches the left eye and the right eye so that a 2D image is recognized.

FIG. 2 shows a case where the display panel 300 and the liquid crystal lens panel 400 operate in 3D mode. The liquid crystal lens panel 400 divides an image from the display panel 300 into a left eye visual field and a right eye visual field and diffracts the image so that a 3D image is perceived.

Figure 3:
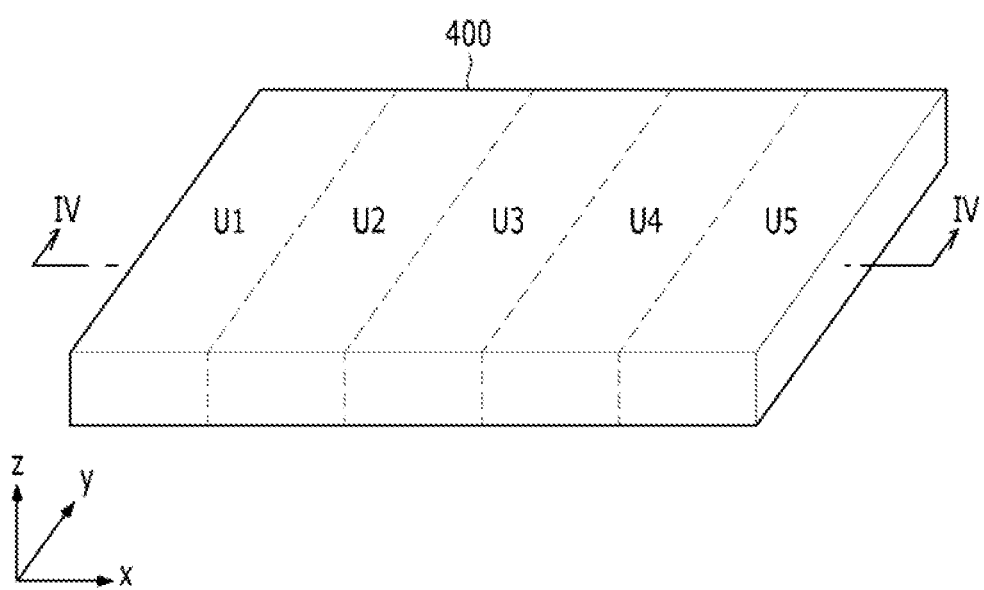
FIG. 3 is a perspective view showing a liquid crystal lens panel included in a display device in accordance with a present exemplary embodiment.
Figure 4:
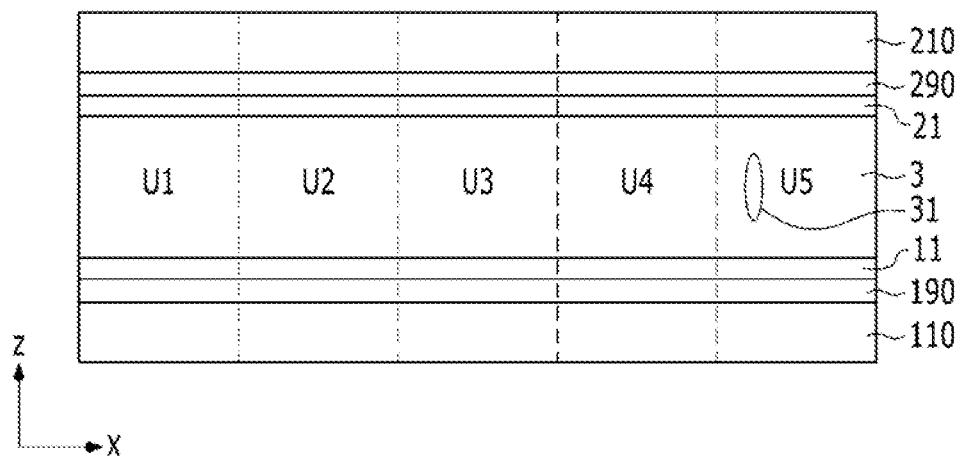
FIG. 4 is a cross-sectional view showing the liquid crystal lens panel taken along a line IV-IV shown FIG. 3.
Figure 5:
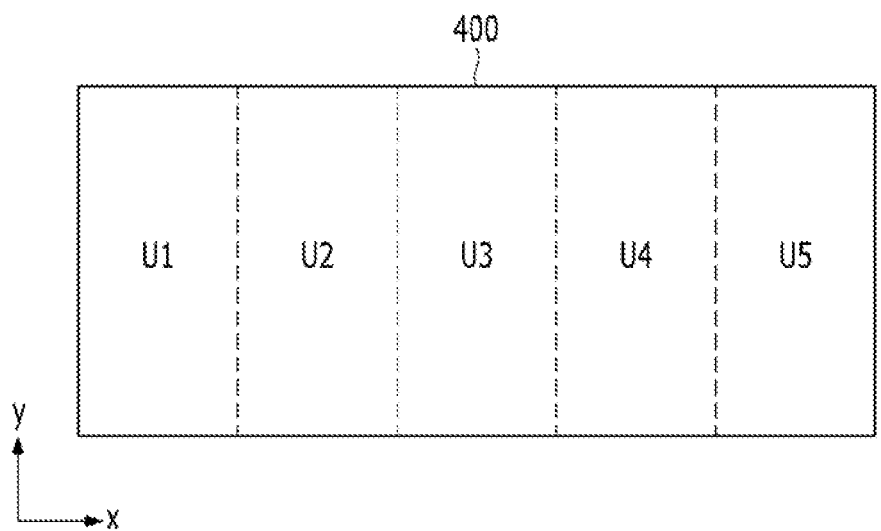
FIG. 5 shows an example of a top view of an x-y plane of the liquid crystal lens panel shown in FIG. 3.

FIG. 3 is a perspective view showing a liquid crystal lens panel included in a display device in accordance with a present exemplary embodiment. FIG. 4 is a cross-sectional view showing the liquid crystal lens panel taken along a line IV-IV shown FIG. 3. FIG. 5 shows an example of a top view of an x-y plane of the liquid crystal lens panel shown in FIG. 3.

Referring to FIG. 3 to FIG. 5, the liquid crystal lens panel 400 includes a plurality of unit elements (U1-U5) sequentially provided in an x-axis direction. Although five unit elements are shown, this number is exemplary and non-limiting, and liquid crystal lens panel in other embodiments may have more or fewer unit elements. A single unit element covers a point N, where N is a positive integer, of the display panel 300. A single point corresponds to a single pixel. For example, a unit element may cover point 9. One unit element may serve as one lens.

The liquid crystal lens panel 400 is made of an insulating material such as glass or plastic, and includes a first substrate 110 and a second substrate 210 facing each other, and a liquid crystal layer 3 provided between the two substrates 110 and 210.

A first electrode layer 190 and an alignment layer 11 are sequentially disposed on the first substrate 110. A second electrode layer 290 and an alignment layer 21 are sequentially disposed on the second substrate 210. The first electrode layer 190 and the second electrode layer 290 may be made of a transparent conductive material such as indium tin oxide (ITO) or indium zinc oxide (IZO). The first electrode layer 190 may be patterned into a plurality of linear electrodes, which will be described later with reference to FIG. 9. The second electrode layer 290 may be formed as a plate-like electrode instead of being patterned.

FIG. 5 shows a non-limiting example in which the boundaries between the unit elements U1 to U5 of the switching panel are parallel with the y axis.

Figure 6:
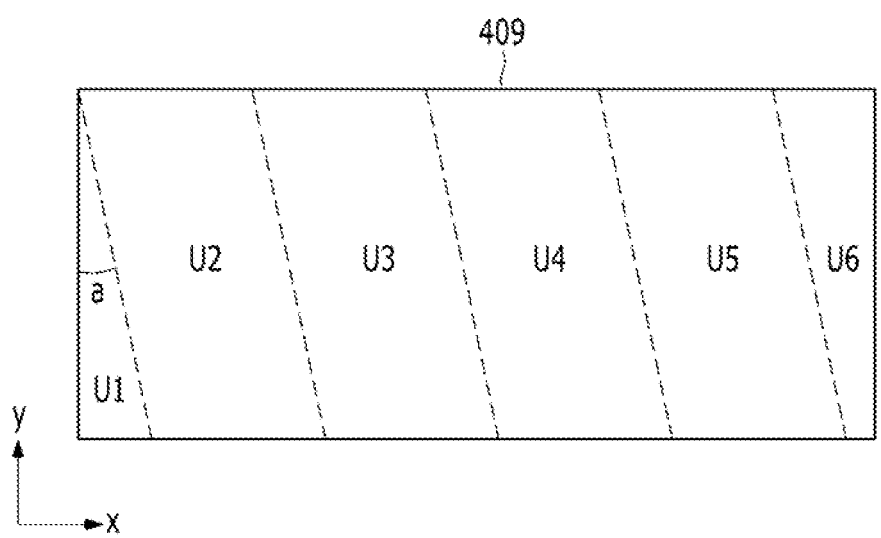
FIG. 6 shows another example of a top view of the x-y plane of the liquid crystal lens panel shown in FIG. 3.

FIG. 6 shows another example of a top view of an x-y plane of the liquid crystal lens panel shown in FIG. 3.

Referring to FIG. 6, a switching panel 409 includes a plurality of unit elements (U1-U6), and the boundaries of the unit elements U1 to U6 are slanted by an angle "a" with respect to the y axis. For example, "a" may be in a range of 10 to 30 degrees.

For ease of description, it will be assumed that the boundaries of the unit elements U1 to U5 of the liquid crystal lens panel 400 are parallel with the y axis.

Referring to FIG. 4, the first electrode layer 190 and the second electrode layer 290 form an electric field in the liquid crystal layer 3 according to an applied voltage to control the arrangement of liquid crystal molecules 31 of the liquid crystal layer 3. The alignment layers 11 and 21 determine the initial alignment of the liquid crystal molecules 31 of the liquid crystal layer 3. The liquid crystal layer 3 may be a vertical alignment (VA) mode liquid crystal. In VA mode, each of the alignment layers 11 and 21 is a vertical alignment layer in which the liquid crystal molecules 31 are aligned perpendicular with respect to the alignment layers 11 and 21, and normal with respect to the substrates 110 and 210.

The liquid crystal lens panel 400 is operable in 2D mode or 3D mode according to the voltage applied to the first electrode layer 190 and the second electrode layer 290. When no voltage is applied to the first and second electrode layers 190 and 290, the liquid crystal lens panel 400 is operated in the 2D mode.

When a voltage is applied to the first and second electrode layers 190 and 290, the liquid crystal lens panel 400 can be operable in the 3D mode. For this purpose, an initial alignment direction of the liquid crystal molecules 31 can be appropriately controlled.

When the liquid crystal lens panel 400 is operated in 3D mode, each respective unit element U1 to U5 of the liquid crystal lens panel 400 functions as a single lens. The liquid crystal molecules 31 are initially aligned for the respective unit elements U1 to U5 to function as a lens.

An operating principle will now be described by which the liquid crystal lens panel 400 operates in 3D mode as either a gradient index (GRIN) lens or a Fresnel zone plate.

Figure 7:
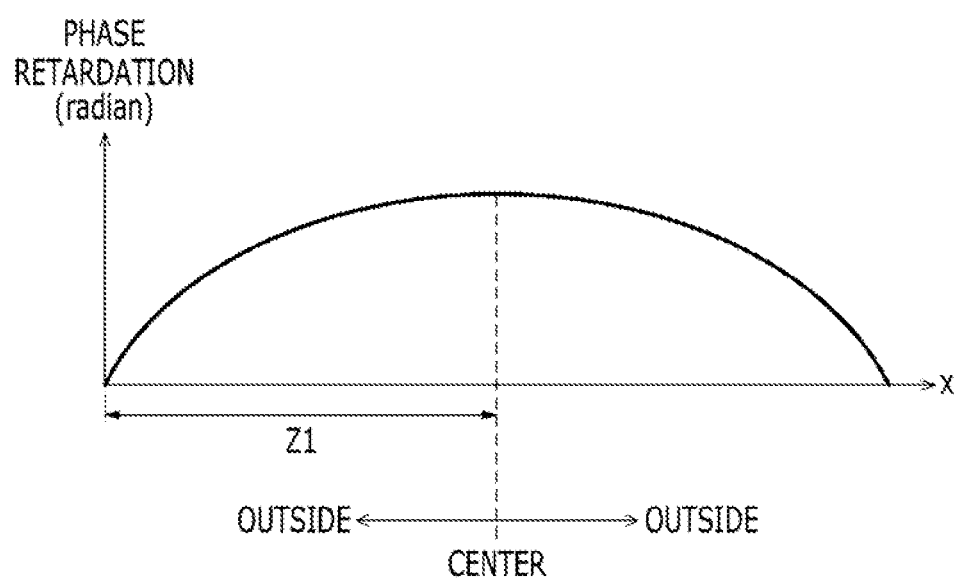
FIG. 7 shows an example of a phase retardation as a function of position at one unit element.
Figure 8:
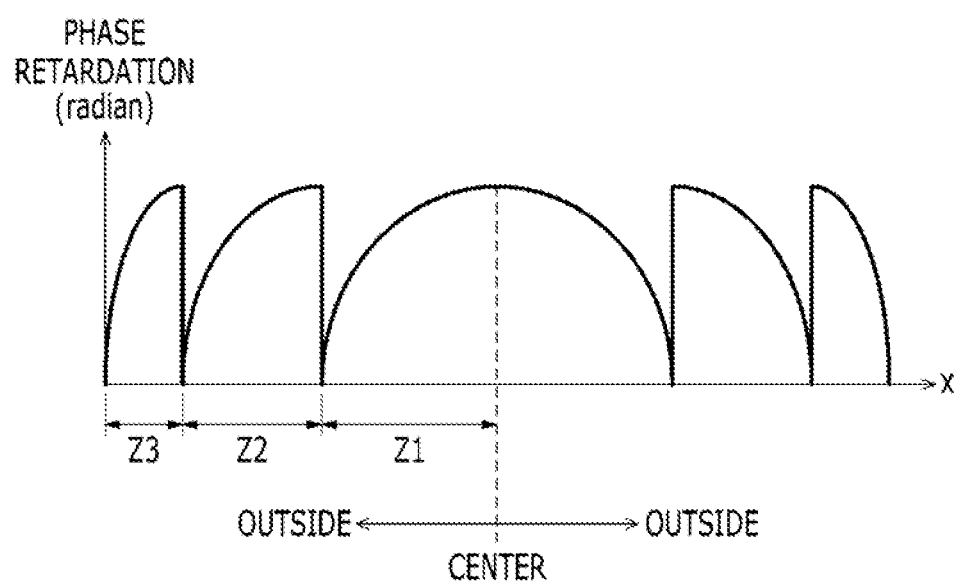
FIG. 8 shows another example of a phase retardation as a function of position at one unit element.

FIG. 7 shows an example of phase retardation as a function of position at one unit element. FIG. 8 shows another example of phase retardation as a function of position at one unit element. FIG. 7 shows a case in which a unit element works as a GRIN lens, and FIG. 8 shows a case in which a unit element functions as a Fresnel zone plate.

A Fresnel zone plate generally means a device functioning as a lens by using a plurality of concentric circles that are radially arranged and in which intervals therebetween decrease from the center to the outer part, as Fresnel zones, and that uses light diffraction instead of refraction.

Referring to FIG. 7 and FIG. 8, a unit element includes at least one zone sequentially disposed outward from a center part of the unit element. The zones of the unit elements of FIG. 7 and FIG. 8 may be disposed symmetrically with respect to the center. FIG. 7 shows a case having a single zone Z1 disposed between the unit element center and the outer part thereof. FIG. 8 shows a case having a plurality of zones Z1 to Z3 disposed between the unit center and the outer part thereof. In FIG. 8, widths of the zones Z1 to Z3 of the unit element become narrower with increasing distance from the center. FIG. 8 illustrates the case in which three zones Z1 to Z3 are disposed outward from the center.

In FIG. 7, phase retardation of the zone Z1 of the unit element increases toward the center and decreases toward the outer part. In FIG. 8, phase retardations of the zones Z1 to Z3 of the unit element increase with decreasing distance to the center from the outer part. The phase retardations of the unit elements in FIG. 7 and FIG. 8 can be symmetric.

A unit element can refract light passing therethrough to be gathered at a focal point through diffraction, destructive interference, and constructive interference by forming a phase retardation distribution as shown in FIG. 7 or FIG. 8. As such, the unit element can function as a lens by operating as a GRIN lens or a Fresnel zone plate.

Hereinafter, the liquid crystal lens panel 400 in which a unit element is operated as a Fresnel zone plate will be described with reference to FIGS. 9 to 13. The liquid crystal lens panel 400 may be referred to as a switchable zone plate.

Figure 9:
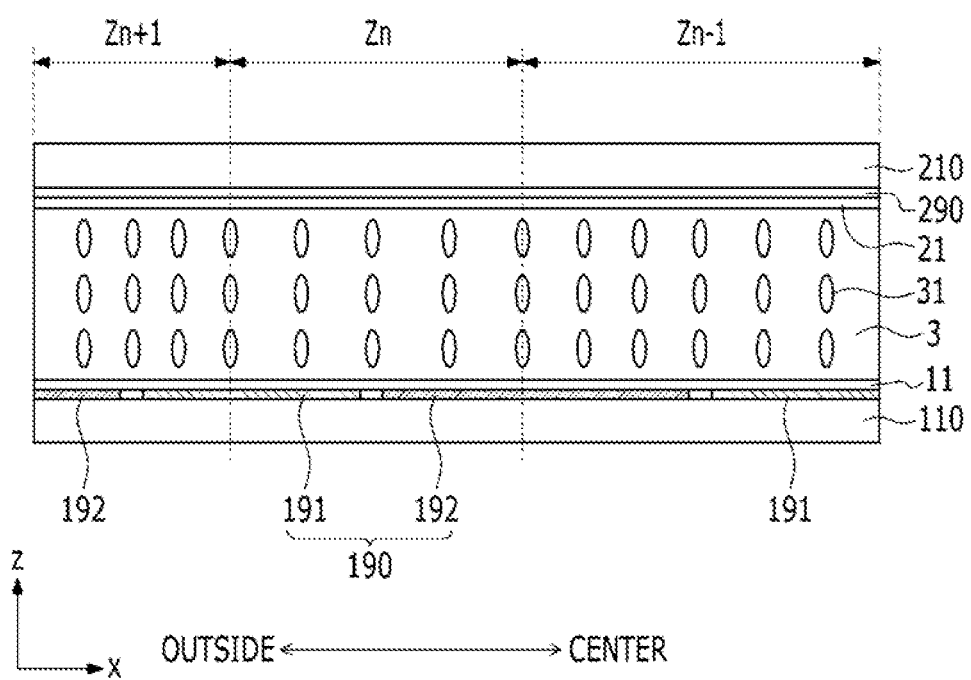
FIG. 9 is a partial cross-sectional view of a liquid crystal lens panel in which a unit element is operated as a Fresnel zone plate in accordance with a present exemplary embodiment.
Figure 10:
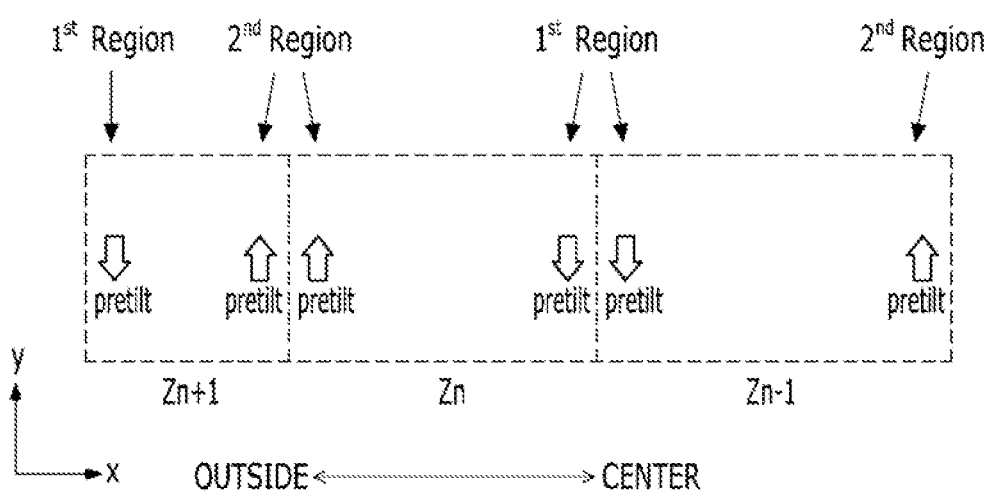
FIG. 10 is a view that illustrates a pre-tilt direction of the liquid crystal lens panel in accordance with a present exemplary embodiment.
Figure 11:
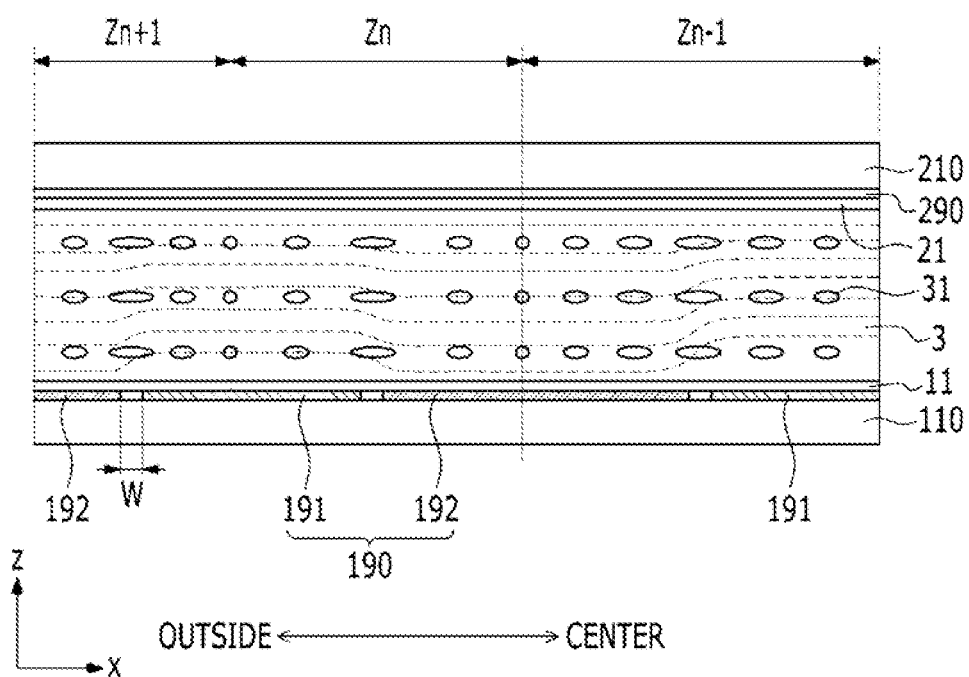
FIG. 11 is a partial cross-sectional view of a liquid crystal lens panel in which a unit element is operated as a Fresnel zone plate in accordance with a present exemplary embodiment.
Figure 12:
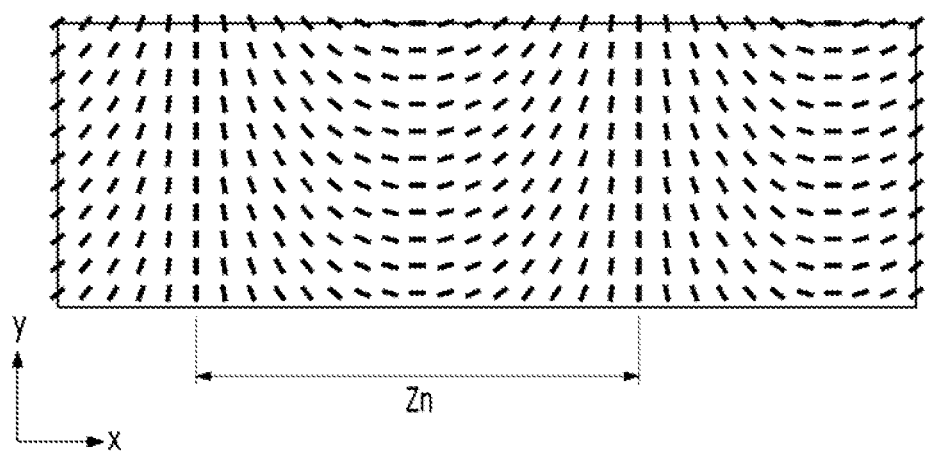
FIG. 12 is an x-y plane view of an arrangement of the liquid crystal molecules of a liquid crystal lens panel being operated in a 3D mode in accordance with a present exemplary embodiment.
Figure 13:
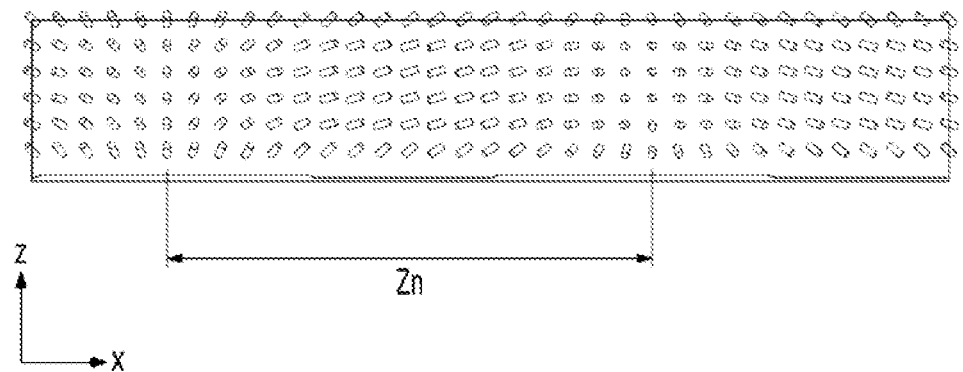
FIG. 13 is an x-y plane view of an arrangement of the liquid crystal molecules of a liquid crystal lens panel being operated in a 3D mode in accordance with a present exemplary embodiment.

FIG. 9 is a partial cross-sectional view showing a liquid crystal lens panel in which a unit element is operated as a Fresnel zone plate in accordance with a present exemplary embodiment. FIG. 10 is a view that illustrates a pre-tilt direction of the liquid crystal lens panel in accordance with a present exemplary embodiment. FIG. 11 is a partial cross-sectional view of a liquid crystal lens panel in which a unit element is operated as a Fresnel zone plate in accordance with a present exemplary embodiment. FIG. 12 is an x-y plane view of an arrangement of liquid crystal molecules of a liquid crystal lens panel being operated in 3D mode in accordance with a present exemplary embodiment. FIG. 13 is an x-y plane view of the arrangement of the liquid crystal molecules of a liquid crystal lens panel being operated in 3D mode in accordance with a present exemplary embodiment.

Referring to FIGS. 9 to 13, in a present exemplary embodiment, an $(n+1)^{th}$ zone $Z(n+1)$, an $n^{th}$ zone Zn, and an $(n-1)^{th}$ zone $Z(n-1)$ included in the unit element of the liquid crystal lens panel 400 are shown. FIG. 9 shows a case in which the liquid crystal lens panel 400 is operated in 2D mode, and FIG. 11 shows a case in which the liquid crystal lens panel 400 is operated in 3D mode.

The first electrode layer 190 disposed on the first substrate 110 includes a plurality of first linear electrodes 191 and second linear electrodes 192. The first linear electrodes 191 and the second linear electrodes 192 may extend in a direction parallel to the y-axis, and may be alternately arranged in the x-axis direction. A pair of adjacent first and second linear electrodes 191 and 192 may be separated by a predetermined distance W. The width of the first linear electrodes 191 and the second linear electrodes 192 may increase with decreasing distance from the center. This corresponds to a phase retardation change as a function of unit element position.

One zone includes a part of a corresponding first linear electrode 191 and a part of a corresponding second linear electrode 192. For example, the $n^{th}$ zone Zn may include a part of a first linear electrode 191 that extends over the $(n+1)^{th}$ zone $Z(n+1)$ and the $n^{th}$ zone Zn, and a part of a second linear electrode 192 that extends over the $(n-1)^{th}$ zone $Z(n-1)$ and the $n^{th}$ zone Zn. In other words, the first linear electrodes 191 and the second linear electrodes 192 may be disposed to extend over adjacent zones.

The second electrode layer 290 facing the first electrode layer 190 is formed as one electrode. A reference voltage such as a common voltage is applied to the second electrode layer 290.

In 2D mode, the reference voltage is applied to the first linear electrode 191 and the second linear electrode 192. Specifically, in 2D mode, a reference voltage of the same magnitude is applied to the first linear electrode 191, the second linear electrode 192, and the second electrode layer 290. Accordingly, no voltage difference is generated between the first linear electrode 191, the second linear electrode 192, and the second electrode layer 290. The liquid crystal layer 3 is aligned in VA mode. Accordingly, as shown in FIG. 9, the liquid crystal molecules 31 are arranged in a direction normal (z-axis direction) to the substrates 110 and 210. Since all the liquid crystal molecules 31 are arranged in the z-axis direction, substantially the same phase retardation is generated, depending on the position of the liquid crystal lens panel 400. In other words, no phase retardation differences that depend on a position in the liquid crystal lens panel 400 are generated, and the liquid crystal lens panel 400 is operated in 2D mode without functioning as a lens.

The liquid crystal molecules 31 in one zone adjacent to the alignment layers 11 and 21 are aligned to be pre-tilted in a first direction in a first region and in a second direction in a second region. Being pre-tilted indicates an inclination of a director of the liquid crystal layer 3 with respect to the substrates 110 and 210. The first direction and the second direction may be opposite to each other. For example, the liquid crystal molecules 31 on the first linear electrode 191 may be pre-tilted in the first direction, while the liquid crystal molecules 31 on the second linear electrode 192 may be pre-tilted in the second direction.

Further, the liquid crystal molecules 31 adjacent to the alignment layers 11 and 21 may be aligned at the boundary region between adjacent zones so as to be pre-tilted in the same direction.

As shown in FIG. 10, the pre-tilt direction in a first region of the $n^{th}$ zone Zn may be a positive y-axis direction, while the pre-tilt direction in a second region thereof may be a negative y-axis direction. The pre-tilt direction in a first region of the $(n+1)^{th}$ zone $Z(n+1)$ adjacent to the $n^{th}$ zone Zn may be the negative y-axis direction, while the pre-tilt direction at a second region thereof may be the positive y-axis direction.

A boundary region is formed between the second region of the $(n+1)^{th}$ zone $Z(n+1)$ and the first region of the (n+1)th zone $Z(n+1)$, and the pre-tilt direction at the boundary portion is the positive y-axis direction. The division of a zone into the first region and the second region is based on the phase retardation of each zone.

As such, the alignment layers 11 and 21 may be light-aligned so that the pre-tilt direction of the liquid crystal molecules 31 alternately change from the first direction (positive y-axis direction) to the second direction (negative direction) and from the second direction to the first direction along the x-axis direction from the outside edge of the liquid crystal layer to the center of the liquid crystal layer.

In 3D mode, a first voltage is applied to the first linear electrode 191, a second voltage is applied to the second linear electrode 192, and a reference voltage is applied to the second electrode layer 290. The first and second voltages have different magnitudes. Accordingly, a first voltage difference V1 is generated between the second electrode layer 290 and the first linear electrode, and a second voltage difference V2 is generated between the second electrode layer 290 and the second linear electrode 191. The first voltage V1 may be greater or lesser than the second voltage V2.

FIG. 11 illustrates a case in which the first voltage difference V1 is greater than the second voltage difference V2. Dotted lines in the liquid crystal layer 3 shown in FIG.

11 indicate equipotential surfaces. As the first voltage difference V1 and the second voltage difference V2 are generated, the liquid crystal molecules 31 are initially inclined in the pre-tilt direction. For example, the pre-tilt direction of the liquid crystal molecules 31 located in the first region of the $n^{th}$ zone Zn is the first direction (positive y-axis direction), while the pre-tilt direction of the liquid crystal molecules 31 located in the second region thereof is the second direction (negative y-axis direction). Further, the liquid crystal molecules 31 located between the first region and the second region are inclined in a positive or negative x-axis direction by a potential difference between the first direction and the second direction.

As shown in FIG. 12 and FIG. 13, the liquid crystal molecules 31 are inclined in the first or second direction (positive or negative y-axis direction) in the first region of the $n^{th}$ zone Zn, become sequentially inclined in the x-axis direction toward a middle portion between the first region and the second region, and become sequentially inclined in the second or first direction (negative or positive y-axis direction) in the second region of the $n^{th}$ zone Zn.

Figure 14:
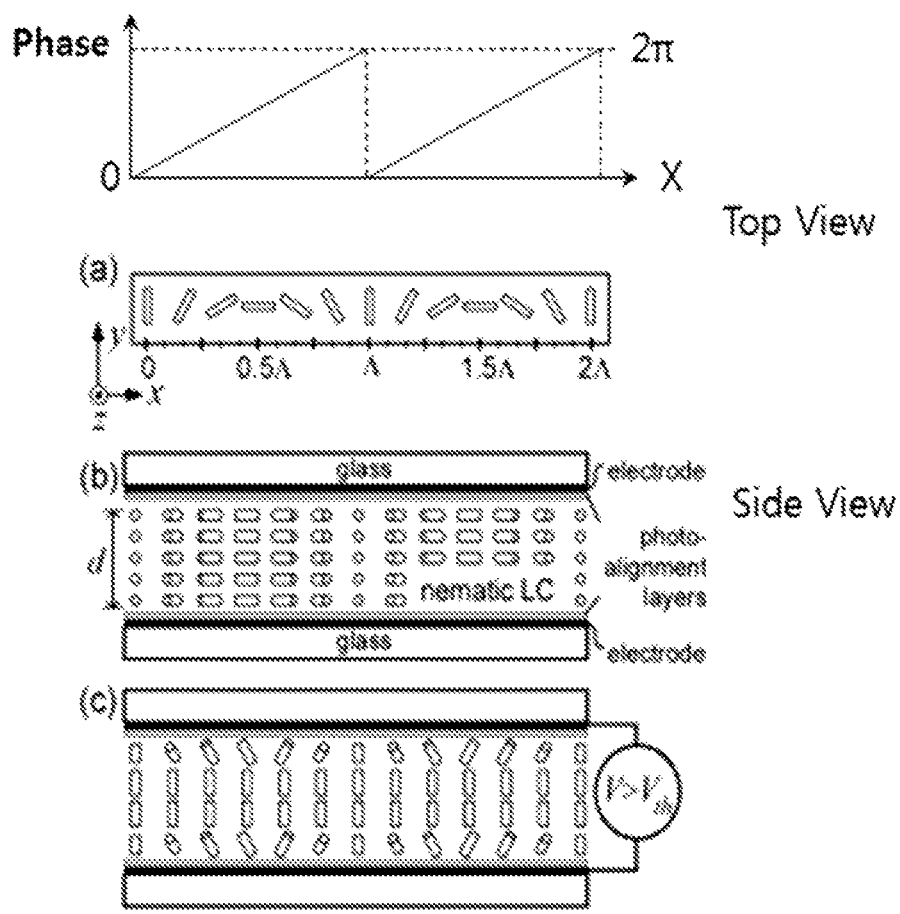
FIG. 14 shows a characteristic of a phase modulation region in accordance with a present exemplary embodiment.

As such, as the first voltage, the second voltage, and the reference voltage are respectively applied to the first linear electrode 191, the second linear electrode 192, and the second electrode layer 290, the liquid crystal molecules 31 rotate in one plane (in-plane rotation). In detail, the liquid crystal molecules located between the first linear electrode 191 and the second linear electrode 192 rotate in one plane. As the liquid crystal molecules 31 rotate in one plane, the phase retardation of each zone increases toward the center therein. This is a characteristic of a QHQ region. A QHQ region has a structure in which a quarter-phase difference plate (a quarter-wave plate), a half-phase difference plate (a half-wave plate), and a quarter-phase difference plate (a quarter-wave plate) are deposited as a triplet. The characteristic of a QHQ region is shown in FIG. 14. FIG. 14 is disclosed in "A Review of Phased Array Steering for Narrow-band Electro-Optical System", Paul F. McManamon, et al., IEEE 2009.

As described above, it becomes unnecessary to provide an additional polarizer to facilitate in-plane rotation of the liquid crystal molecules 31 in 3D mode to provide the liquid crystal layer with a QHQ characteristic. Accordingly, deterioration due to a polarizer of the efficiency of light emitted from the display panel 300 may be prevented. Further, since the first linear electrode 191, the second linear electrode 192, and the second electrode layer 290 need only three power sources, it is possible to reduce unnecessary regions for the disposal of power lines.

While exemplary embodiments of the present disclosure have been particularly shown and described with reference to the accompanying drawings, the specific terms used herein are used for the purpose of describing the embodiments and are not intended to define the meanings thereof or to limit the scope of the disclosure set forth in the claims. Therefore, those skilled in the art will understand that various modifications and other equivalent embodiments of the present disclosure are possible. Consequently, the true technical protective scope of the present disclosure must be determined based on the technical spirit of the appended claims.

What is claimed is:

1. A display device comprising:
a display panel; and
a liquid crystal lens panel that includes:
a first substrate and a second substrate that face each other;
a first electrode layer disposed on the first substrate;
a second electrode layer disposed on the second substrate; and
a liquid crystal layer interposed between the first substrate and the second substrate,
wherein the first electrode layer includes a plurality of first linear electrodes and a plurality of second linear electrodes, the liquid crystal layer includes first liquid crystal molecules adjacent to the first linear electrode that are pre-tilted in a first direction, and second liquid crystal molecules adjacent to the second linear electrode that are pre-tilted in a second direction that is opposite to the first direction.

2. The display device of claim 1, wherein the second electrode layer is a plate-like electrode.

3. The display device of claim 2, further comprising:
a first alignment layer disposed on the first linear electrodes and the second linear electrodes; and
a second alignment layer disposed on the second electrode layer.

4. The display device of claim 3, wherein the first linear electrodes and second linear electrodes extend in a y-axis direction and are alternately disposed in an x-axis direction.

5. The display device of claim 4, wherein the first direction is one of a positive y-axis direction and a negative y-axis direction, and the second direction is the other direction thereof.

6. The display device of claim 5, wherein the liquid crystal lens panel operates in a 2D mode when a reference voltage is applied to the first electrode layer, the first linear electrode, and the second linear electrode, wherein an image displayed by the display panel is recognized as a 2D image.

7. The display device of claim 5, wherein the liquid crystal lens panel operates in a 3D mode when a reference voltage, a first voltage, and a second voltage are respectively applied to the second electrode layer, the first linear electrode, and the second linear electrode, wherein an image displayed by the display panel is recognized as a 3D image.

8. The display device of claim 7, wherein a first voltage difference between the second electrode layer and the first linear electrode differs from a second voltage difference between the second electrode layer and the second linear electrode.

9. The display device of claim 7, wherein when the liquid crystal lens panel operates in 3D mode, the liquid crystal molecules located between the first linear electrode and the second linear electrode rotate in one plane that is parallel to a surface of the first substrate facing to the second substrate.

10. A liquid crystal lens panel, comprising:
a first substrate that includes a first linear electrode and a second linear electrode;
a second substrate that includes a plate-like electrode; and
a liquid crystal layer interposed between the first substrate and the second substrate that includes a unit element,
wherein the first linear electrode and the second linear electrode form a zone in the unit element, the zone includes a first region at a side of the first linear electrode and a second region at a side of the second linear electrode, liquid crystal molecules are pre-tilted in a first direction in the first region, and liquid crystal molecules are pre-tilted in a second direction opposite the first direction in the second region.

11. The liquid crystal lens panel of claim 10, further comprising:
a first alignment layer disposed on the first linear electrode and the second linear electrode; and a second alignment layer disposed on the plate-like electrode.

12. The liquid crystal lens panel of claim 10, wherein the first linear electrode and the second linear electrode respectively include a plurality of first linear electrodes and a plurality of second linear electrodes, and
the first linear electrodes and second linear electrodes extend in a y-axis direction and are alternately disposed in an x-axis direction.

13. The liquid crystal lens panel of claim 12, wherein the unit element includes a plurality of zones, and a width of each zone becomes narrower with increasing distance from a center thereof.

14. The liquid crystal lens panel of claim 12, wherein the first direction is one of a positive y-axis direction and a negative y-axis direction, and the second direction is the other direction thereof.

15. The liquid crystal lens panel of claim 10, wherein the liquid crystal lens panel operates in a 2D mode when a reference voltage is applied to the plate-like electrode, the first linear electrode, and the second linear electrode, wherein an image displayed by the liquid crystal lens panel is recognized as a 2D image.

16. The liquid crystal lens panel of claim 10, wherein the liquid crystal lens panel operates in a 3D mode when a reference voltage, a first voltage, and a second voltage are respectively applied to the plate-like electrode, the first linear electrode, and the second linear electrode, wherein the unit element forms a lens and wherein an image displayed by the liquid crystal lens panel is recognized as a 2D image.

17. The liquid crystal lens panel of claim 16, wherein a first voltage difference between the plate-like electrode and the first linear electrode is different from a second voltage difference between the plate-like electrode and the second linear electrode.

18. The liquid crystal lens panel of claim 16, wherein when the liquid crystal lens panel operates in 3D mode, the liquid crystal molecules located between the first linear electrode and the second linear electrode rotate in one plane that is parallel to a surface of the first substrate facing to the second substrate.

19. A liquid crystal lens panel, comprising:
a first substrate and a second substrate that face each other;
a plurality of first linear electrodes and a plurality of second linear electrodes alternatingly disposed on the first substrate;
a second electrode layer disposed on the second substrate; and
a liquid crystal layer interposed between the first substrate and the second substrate that includes a plurality of unit elements,
wherein
when a reference voltage, a first voltage, and a second voltage are respectively applied to the second electrode layer, the first linear electrodes, and the second linear electrodes, the unit elements form lenses and the liquid crystal lens panel operates in a 3D mode,
in 3D mode, a first voltage difference between the second electrode and the first linear electrode differs from a second voltage difference between the second electrode and the second linear electrode, and
liquid crystal molecules located between the first linear electrode and the second linear electrode rotate in one plane.

20. The liquid crystal lens panel of claim 19,
wherein the first linear electrode and the second linear electrode form a zone in each unit element, the zone includes a first region at a side of the first linear electrode and a second region at a side of the second linear electrodes, the liquid crystal molecules are pre-tilted in a first direction in the first region and are pre-tilted in a second direction opposite the first direction in the second region,
wherein, when a reference voltage is applied to the second electrode layer, the first linear electrodes, and the second linear electrodes, the liquid crystal lens panel operates in a 2D mode.

* * * * *